June 12, 1962 M. G. JACOBSON 3,039,053
MEANS AND METHODS FOR GAS DETECTION
Filed April 10, 1959 4 Sheets-Sheet 1

INVENTOR.
MOSES G. JACOBSON
BY
Brown, Critchlow, Flick & Peckham
HIS ATTORNEYS

June 12, 1962  M. G. JACOBSON  3,039,053
MEANS AND METHODS FOR GAS DETECTION
Filed April 10, 1959  4 Sheets-Sheet 2

INVENTOR.
MOSES G. JACOBSON
BY
Brown, Critchlow, Flick & Peckham
HIS ATTORNEYS

INVENTOR.
MOSES G. JACOBSON
BY
Brown, Critchlow, Flick & Peckham
HIS ATTORNEYS

June 12, 1962 M. G. JACOBSON 3,039,053
MEANS AND METHODS FOR GAS DETECTION
Filed April 10, 1959 4 Sheets-Sheet 4

INVENTOR.
MOSES G. JACOBSON
BY
Brown, Critchlow, Flick & Peckham
HIS ATTORNEYS

3,039,053
Patented June 12, 1962

1

3,039,053
MEANS AND METHODS FOR GAS DETECTION
Moses G. Jacobson, Penn Hills, Pa., assignor to Mine Safety Appliances Company, Pittsburgh, Pa., a corporation of Pennsylvania
Filed Apr. 10, 1959, Ser. No. 805,630
27 Claims. (Cl. 324—71)

The present invention relates generally to the detection of gaseous components in an ambient by observing their effects on semiconductor devices and, more particularly, to improved methods and apparatus for detecting and at least partially analyzing gaseous constituents of an ambient, especially fluorine-containing gases, by determining the effect of these constituents upon the electrical characteristics of a semiconductor device.

These are now on file in the United States Patent Office three patent applications disclosing and claiming inventions, of the present inventor, relating broadly to the detection of ambient components by semiconductors and which include novel apparatus, circuitry, methods, and semiconductor diodes. These three applications were filed on May 6, 1957, and are Serial No. 657,271, now Patent No. 2,965,842, entitled "Detection of Ambient Components by Semiconductors"; Serial No. 657,304, now Patent No. 2,940,041, entitled "Semiconductor Diode Constructions for Use in Gas Detection"; and Serial No. 657,343, now Patent No. 2,975,362, entitled "Semiconductor Diodes for Gas Detection." In those applications, in addition to disclosing several inventions, I have detailed the theories and experiments of myself and others that were directed to various applications of semiconductors. I have also set forth a number of concepts in that field, which are of pertinence in understanding those and the present invention, that I derived in consequence of observed experimental facts. To avoid repeating that subject matter in this application, it should be understood that reference may be made to those applications for the materials they contain. Furthermore, in certain aspects of the present invention, structures disclosed in my prior applications can be used in place of novel structures of the present invention that will be described hereinafter. Here, too, reference may be made to the filed cases for details of those devices rather than repeating them bodily in this application.

As noted, the present invention uses concepts disclosed in my prior applications. For example, my discovery that the most consistent and also the most practical method for utilizing the effect of gases and vapors on semiconductors for detection and quantitative determination of gases or vapors is to employ a device having one or more rectifying contacts or junctions between a semiconductor and a metal, between a semiconductor and another semiconductor of different conductivity, or between two metals with substantially different electrical characteristics, is used and extended in the invention of the present application. In the following description, as in my earlier applications, these contacts or junctions are referred to generally as boundaries between two materials of substantially different conductivities which boundaries usually provide some degree of rectification with respect to passage of electric current.

The present invention is based on and utilizes, in addition to the foregoing concepts, my discoveries that (1) the sensitivity of contacts or junctions for water vapor is about one order of magnitude lower than for polar fluorine-containing molecules; (2) the sensitivity for both water vapor and fluorine-containing molecules increases with applied voltage but the increase for the fluorine-containing molecule is much more rapid than for water vapor; and (3) the sensitivity of the detector for water vapor at a given voltage is only 10 to 15 percent higher

2 for a diode polarized in the reverse direction as compared with the same diode polarized in the forward direction while the equivalent sensitivity for polar fluorine-containing compounds increases on the order of 200 to 500 percent.

As a consequence of these discoveries, I am able to provide methods and apparatus by which polar compounds, especially polar fluorine-containing compounds, can be readily detected and measured even when present in very small amounts in an ambient that contains considerable amounts of water vapor. It is also possible in accordance with my invention, in many cases, to detect non-polar fluorine-containing compounds. Moreover, the invention permits the detection of polar components in gaseous mixtures containing other polar components that interfere with the desired detection by use of sensing elements, connected in series or parallel, that are used to compensate against the effects of interfering materials, particularly water vapor. As more fully brought out below, this latter feature is conducted with each of the compensating elements biased by a lower electrical energy than the detecting element. Still further my invention permits the use of conventional junction-containing semiconductors in the practice of several of the processes.

It is, therefore, a major object of the present invention to provide new methods and apparatus utilizing a semiconductor material to distinguish between water vapor and polar molecules, especially polar fluorine-containing molecules in an ambient.

A further object of the invention is to provide methods and apparatus for determining fluorine-containing nerve gases in an ambient.

An additional object of the invention is to provide a new method and apparatus including a semiconductor material to detect and determine the quantity of certain polar gases in an ambient in the presence of other strongly polar components.

Yet another object is to provide gas detection apparatus including novel rectifying contacts or junctions that are particularly suitable for determining polar gases, especially polar fluorine-containing gases.

An additional object is to provide gas detection apparatus that includes a plurality of rectifying contacts or junctions for use in determining components in an ambient.

The invention will be best understood by reference to the following detailed description taken in connection with the accompanying drawings in which.

Figure 1:
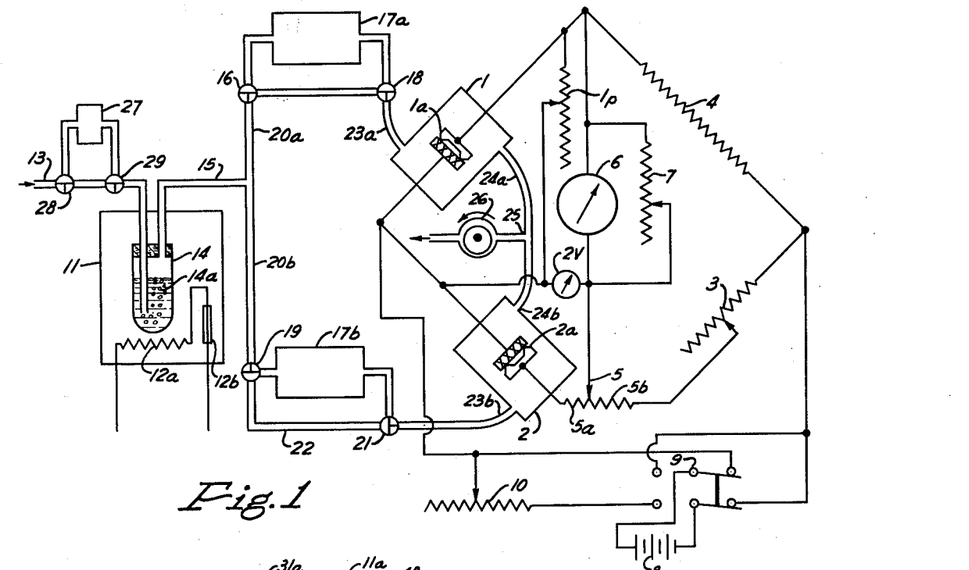
FIG. 1 shows a gas detection device illustrating apparatus associated with semiconductor elements.

Referring to FIG. 1 of the drawings, there is shown a circuit arrangement and auxiliary equipment for use in gas detection in accordance with the principles of this invention.

The circuit comprises two semiconductor type diodes $1a$ and $2a$, having junctions or boundaries at least partially exposed to gas in housings 1 and 2 respectively. These diodes can be of the type described in my copending applications identified above or, if desired, can be of the novel type hereinafter described.

Diodes $1a$ and $2a$ are connected to serve in parallel arms of a balanced Wheatstone bridge arrangement. Diode $1a$ serves as one arm thereof, diode $2a$ and an adjustable portion $5a$ of the resistance of the potentiometer 5 constitute a second arm, a fixed resistance 4 is a third arm while the remaining portion $5b$ of the resistance of the potentiometer 5 and adjustable resistance 3 comprise the remaining arm. The value of the fixed resistance 4 is determined largely by the characteristics of the diodes; however, in my experience I have found that a resistance of 50 to 200 ohms is suitable for use in conjunction with the majority of germanium type diodes. Adjustable resistance 3 ordinarily is of a total range slightly greater than the value of resistance 4. The potentiometer 5 serves to permit a fine adjustment of the balance of the bridge and its resistance generally is about 5 to 10 ohms in range. The bridge is completed by an indicating microammeter 6 (range up to about 100 microamps.) provided with an adjustable shunt 7 to accommodate various ranges of sensitivity.

Energizing potential for the bridge A is provided by means of a unidirectional voltage, suitably a storage battery 8. The battery 8 is connected to the bridge through a double pole double throw switch 9. One set of leads from the switch places the battery across the circuit through an adjustable resistance device 10, while the other set of leads by-passes that resistance and applies the full voltage of the battery to the bridge. The double pole double throw switch provides polarity reversal so as to change direction of the current through the exposed boundary of the semiconductor diodes for purposes indicated hereinafter. Accordingly, a low voltage is applied in the forward direction while high voltage is applied with the diodes polarized in the reverse direction. It will be understood by those skilled in the art that the same objective of low forward voltage-high voltage in the reverse direction can be provided in other ways, for example by using two batteries of different terminal voltage or by adapting a battery to use only part of its cells in one direction while using all of them in the other direction.

As will be indicated more fully hereinafter, the effect produced on the detector diodes connected in adjoining bridge arms by water vapor can be equalized. For this purpose, a resistance $1p$ (about 2000 ohms adjustable) in shunt with detector diode $1a$ is provided. Voltmeter $2V$ is connected across detector diode $2a$ and measures the voltage applied to it as well as to detector $1a$, when the bridge is in balance and the microammeter 6 is at null reading.

Gas samples enter the apparatus through conduit 13 and are conducted by means including conduits $20a$ and $20b$ to housings 1 and 2 respectively. The gas samples enter housings 1 and 2 through inlets $23a$ and $23b$ and emerge therefrom through outlets $24a$ and $24b$, respectively. The outlets are functionally attached through T coupling 25 to a suction pump 26 that serves to provide the moving power to conduct the ambient through the system.

The gas ambient being tested usually enters the apparatus from the atmosphere suspected of being contaminated. Accordingly, the humidity in the gas samples is most likely to vary from sample to sample. To compensate for that situation, the gas samples are drawn into the system through a device 11 that functions to adjust the humidity of any sample to a predetermined desired value and keep the humidity constant at this value notwithstanding wide variations in humidity of the ambient being tested. For this purpose, the gas sample is passed through a bubbler vessel 14 containing a saturated salt solution $14a$ capable of producing a constant humidity at constant temperature. A heater $12a$ and an associated thermostat $12b$, powered by a source of current (not shown), are provided to maintain the bath solution $14a$ at the desired temperature level. Lists of salts that are suitable for this purpose can be found in standard references such as on page 2309 of the 37th edition of the Handbook of Chemistry and Physics. Certain acid solutions also serve this purpose.

It has been established by applicant that the humidity value of samples brought into contact with the semiconductor elements is most advantageously maintained between 15 and 85 percent. At humidities below 15 percent the effect of temperature becomes too intensive, and thermostating must be carried out to within very close limits. At humidities in excess of 85 percent, a decrease in sensitivity to certain substances becomes pronounced. Examples of salt solutions for humidity control within the foregoing limits are: A saturated aqueous solution of calcium chloride hexahydrate ($CaCl_2 \cdot 6H_2O$) at 18.5° C. provides a humidity of 35 percent, and at 20° C. a humidity of 32.3 percent. A saturated aqueous solution of potassium carbonate dihydrate ($K_2CO_3 \cdot 2H_2O$) will provide a 44 percent humidity at 18.5° C., and a 43 percent humidity at 20° C. A saturated aqueous solution of ammonium sulfate [$(NH_4)_2SO_4$] at 20° C. provides 81 percent humidity, and 81.1 percent humidity in the range of 25° to 30° C. Other examples can be readily found by the artisan in standard references.

It will be understood that the selection of a particular liquid to provide humidity control can be influenced by considerations in addition to the humidity to be maintained. For example, some of these salts produce alkaline solutions while others are acid. Materials such as methylisopropoxyfluorophosphine oxide and isopropyl methyl phosphonofluoridate, and similar fluorine-containing nerve gases (G gases) may hydrolyze deleteriously in either alkaline or extremely acid solutions. Accordingly, a suitable solution pH should be maintained when those substances are to be detected. Experiment has shown that a solution pH of about 1.0 to 7.0 can be used when G substances are being detected.

Similarly, water solubility can be a problem in certain instances such, for example, as where G substances are to be detected. After a number of tests with air contaminated by G substances or other organics under test, the humidity stabilizing solutions will have dissolved a certain quantity of the test substances, and thereafter exact standardization of the apparatus on clean air will become impossible inasmuch as some of the test substances will be slowly given up again and will contaminate the air reaching the detector. To cope with this situation filter 27 is provided across inlet 13 prior to humidity stabilizer 11. By means of valves 28 and 29 the ambient gas can be conveyed to stabilizer 11 either directly or after having passed through filter 27. The filter 27 is filled with an absorbent, such as activated charcoal, silica gel or the like, capable of removing G substances and other organics from a sample. Upon removal of the constituents by the absorbent in filter 27, the sample is passed through the system and the diodes are then balanced in a manner that is indicated below in conjunction with a discussion of a detailed operational procedure.

Gases leave the humidity stabilizer 11 through a conduit 15. They then divide, one portion going through conduit 20a to detector housing 1 while the other passes through conduit 20b to housing 2. A by-pass to a filter 17a is provided in line 20a and is controlled by valves 16 and 18. A by-pass 22 around filter 17b in line 20b is also provided and is controlled by valves 19 and 21. Filters 17a and 17b generally are identical in construction. Where G substances are to be detected, these filters are provided with a material that preferentially absorbs the G substances. Examples of suitable absorbents include hexylene glycol, diethyl phthalate and strong solutions of potassium or sodium hydroxide.

The apparatus shown in FIG. 1 is of particular use in detecting polar fluorine-containing organic compounds such, for example, as the G substances, though the apparatus and principles of the invention are of general applicability. Accordingly, its operation in connection with the detection of those substances may now be described.

A sample from the ambient suspected of containing the G substance, and which can be in the field or a laboratory where such a gas is being tested or in a manufacturing area where leaks can occur, is drawn continuously into inlet conduit 13 by means of suction pump 26. Valves 28 and 29 are set to direct the sample through a body of activated charcoal in filter 27 where all organics including any G substance present are absorbed. The sample then passes into the humidity stabilizing solution in bubbler 14. The gas of constant humidity emerging from the bubbler is drawn through the entire apparatus and exhausted through suction pump 26. This conditioning is continued, while alternately passing the sample through the by-passes in lines 20a and 20b and through the filters associated therewith, until the entire system is purged. Then, with filtered sample flowing in the system, current is applied to the bridge by closing the switch 9 to the left thereby incorporating variable resistance 10 in the circuit; this passes current to the diodes in the forward direction. The voltage applied is adjusted, by means of resistance 10, to about 1 volt. Then the bridge is brought to a zero reading on the microammeter 6 by adjusting the potentiometer 5. At this time, the polarity is reversed by reversing the position of switch 9. The resulting imbalance of the bridge is corrected by adjusting resistance 1p of the shunt to detector diode 1a. A reversal of the switch 9 to polarize the diodes in the forward direction will show the unit to be substantially in balance and remain so.

At this point, the apparatus is in condition to make a test on the ambient suspected of contamination. Valves 19 and 21 are aligned to admit a gas sample in line or conduit 20b to pass through selective filter 17b. Valves 16 and 18 are aligned to permit the gas sample in line 20a to pass to housing 1 without going through selective filter 17a. With this arrangement, valves 28 and 29 are adjusted to by-pass filter 27 and the ambient is admitted to the system. The humidity content of the sample will, of course, be the same as during the preliminary adjustment. All contaminants in the sample will pass directly through to detector diode 1a. The sample in line 20b, however, passes through selective filter 17b which selectively removes G substances before the sample reaches detector 2a. With the detector polarized in the forward direction and at a low voltage, deflection of the meter 6 from null will occur only if there is a large quantity (at least 50 p.p.m.) of G substance present in the sample entering detector 1a. With a smaller concentration of G substance, either no reading at all or only a very small one will be observed. Upon throwing switch 9 to the right to reverse the polarity on the diodes, a deflection that is relatively large with respect to the one just noted will result.

By running preliminary tests of the nature just described with samples of known concentration, the deflections obtained can be evaluated in parts per million.

Another mode of operation of this apparatus is to use a mid-scale zero meter for microammeter 6 and pass the gas sample alternately, first to diode 1a directly and to diode 2a by way of filter 17b, and then to diode 2a directly and to diode 1a by way of filter 17a. In this manner the adjustment on clean air need not be made very exactly, and the meter deflection between the two indications will be about twice as large, which is important for detection of very small concentrations.

In the apparatus just described, both of the diodes were used in making a determination of the presence and quantity of G substance in the ambient subjected to test. The same test can be made with but one diode being contacted with the ambient. This can be accomplished by omitting conduit 20b along with its associated filter 17b and housing 2 while using diode 2a merely as a resistance in one arm of the bridge, or by replacing it with another and conventional resistance characterized by a resistance variation with temperature similar to that of diode 1a. The omission of that apparatus can be a physical omission, or can be accomplished by use of valve 19 which can be set to stop flow in conduit 20b.

In any event, where but one diode is used a gas sample is passed continuously and directly through to housing 1 and a reading on the bridge is noted. Then the sample in line 20a is diverted through filter 17a where G substances are selectively removed. The resulting gas is conducted through the housing 1 and a second reading of bridge imbalance is noted. Both readings are taken at the same voltage and polarity on the diode. The change in electrical resistance is a measure of the quantity of G substance removed. Preliminary calibration of this test, as before, can be used to indicate the concentration of G substance in parts per million.

The apparatus shown and described in connection with FIG. 1 is designed to eliminate effects of varying humidity by adjusting the gas sample to and maintaining it at a predetermined humidity by sample conditioning means. As described, these means must be kept at a more or less constant temperature, and otherwise require a considerable amount of care to provide the precision required for measurements in the parts per billion range. This situation has been greatly improved by applying two of my discoveries established upon observing experimental results. These are (1) that the sensitivity of rectifying contacts or junctions increases for both water vapor and polar fluorine-containing molecules with applied voltage, but that the rate of increase for the fluorine-containing materials is much more rapid than for water vapor, and (2) that the sensitivity at equal voltages for water vapor increases 10 to 15 percent when changing from a diode polarized in the forward direction to the same diode polarized in the reverse direction while the comparable sensitivity change for polar fluorine-containing molecules is on the order of 200 to 500 percent.

Tables I and II illustrate typical effects of water vapor. These effects were obtained with a diode consisting of an N-type germanium specimen with a steel ball contact.

Table I shows the effect of water vapor when the diode is used in the reverse direction, and Table II when in the forward direction. The data given in these tables were obtained by the following procedure; room air was passed through the diode until constant resistance was obtained, and simultaneously the relative humidity near the sample inlet was measured by means of a wet and dry bulb psychrometer. With the same voltage applied to the diode, the air was then passed through 2 drying tubes of magnesium perchlorate before contacting the diode, and the resistance of the diode determined when the drying action (as indicated by the resistance increase) had stopped.

TABLE I

*Effect of Humidity of an N-type Ge Diode Polarized in the Reverse Current Direction*

| Applied voltage (volts) | Dry (ohms) | Room humidity (ohms) | Percentage change of resistance rel. to dry | Relative humidity, percent | Percent change of resist. for 1% change in relative humidity |
| --- | --- | --- | --- | --- | --- |
| 1.0 | 179.0 | 151.0 | 16.0 | 23 | 0.69 |
| 2.0 | 198.8 | 163.7 | 18.0 | 20 | 0.90 |
| 4.5 | 192.5 | 156.2 | 18.9 | 18 | 1.05 |
| 6.0 | 185.7 | 146.9 | 21.0 | 20 | 1.05 |

TABLE II

*Effect of Humidity on Same Ge Diode Polarized in the Forward Current Direction*

| Applied voltage (volts) | Dry (ohms) | Room humidity (ohms) | Percentage change of resistance rel. to dry | Relative humidity, percent | Percent change of resist. for 1% change in relative humidity |
| --- | --- | --- | --- | --- | --- |
| 1.0 | 80.0 | 70.9 | 11.0 | 18 | 0.61 |
| 2.0 | 63.3 | 54.5 | 13.0 | 16 | 0.87 |
| 3.5 | 47.9 | 42.2 | 12.0 | 14 | 0.86 |
| 4.0 | 44.8 | 38.6 | 12.7 | 14 | 0.91 |

The estimated accuracy of the figures in the last column is ±5%, which is sufficient to show that: At higher voltages the effect in both current directions is very large. The change is around one percent resistance change for one percent humidity change at temperatures of 75° to 80° F. At lower applied voltages, the effect of water vapor is much smaller. But at all applied voltages the effect is only 5 to 15 percent lower in the forward direction, than in the reverse direction, while from other observations it was learned that the effect of HF and nerve gases, as well as of many other gases and vapors, is very much lower in the forward direction than in the reverse direction.

When humidity control by standardization at a constant value as described is not practical or when the highest possible sensitivity while using such control is needed, the following procedure is carried out: The ambient is drawn into the diode housings as before, with the ambient in both lines being passed through filters 17a and 17b to selectively remove the fluorine-containing components. The bridge circuit is then balanced while these samples are passing through the housings. Then the polarity of the diodes is reversed and a reading is taken. With the samples in the same state (e.g. filtered in filters 17a and 17b) the bridge is balanced with the diodes biased in the forward direction at a higher voltage than before, whereupon the polarity is reversed and a reading is taken. Then the same procedure is followed with samples by-passing filters 17a and 17b. If the resultant change of reading produced by increase of applied voltage in the latter case is materially greater than in the instance of the filtered samples, it can be readily concluded that the fluorine-containing compounds are present.

In the instance of testing ambients in which in addition to the gases searched for, such as for example nerve gases, there are present other polar components such as e.g. hydrogen fluoride, acetone, ether, alcohol, etc., and if the filtering material in filters 17a and 17b is not completely selective, that is, if it is able to absorb also to some extent these other polar components, a second test with a changed applied voltage in the reverse direction for the diodes, will often permit a discrimination from among the gases to be made. This is based on applicant's finding that the sensitivity (meter deflection per unit of concentration) increases with applied voltage, first substantially linearly, and thereafter asymptotically approaches a maximum, and that the rate of this increase of sensitivity with increased voltage and the maxima attained are quite divergent for different substances. Data representative of the foregoing have been obtained on apparatus essentially as shown in FIG. 1 for concentrations in air of 50 p.p.m. of Sarin (a nerve gas), hydrogen fluoride and acetone. These data have been plotted and are presented in FIG. 7. The following are taken from the curves.

Figure 7:
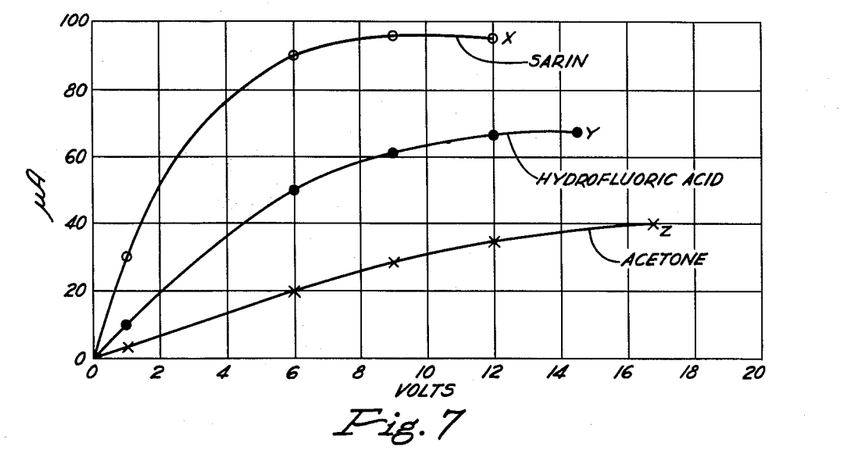
FIG. 7 is a graph showing the response of a semiconductor detector to several ambients at various applied voltages.

| Substance | Voltage change | Microammeter change | Ratio: 6 volt reading over 1 volt reading |
| --- | --- | --- | --- |
| Sarin | 1 to 6 v | 30 to 90 | 3 |
| HF | 1 to 6 v | 10 to 50 | 5 |
| Acetone | 1 to 6 v | 3 to 20 | 6.6 |

With these data it can be concluded, in a test of this kind, that an increase in microammeter reading by a factor close to 3 with a voltage change from 1 to 6 volts indicates the presence of Sarin. A change of greater than three but less than five would lead to the conclusion that there is hydrogen fluoride or acetone present, or both in addition to Sarin; when the 6 volt to one volt reading ratio exceeds 5.0, there is no Sarin present, and when it is 6.6 the active component consists solely of acetone. It should be understood that the foregoing data are merely representative of the principle involved. The exact values vary with the semiconductor material and diode construction as well as concentration. Accordingly, each instrument is first preliminarily calibrated with several known concentrations of the gases or vapors that may be encountered.

As stated above it is possible, in accordance with the present invention, to determine non-polar fluorine-containing molecules in an ambient as well as polar fluorine-containing molecules. Methods whereby this can be accomplished can best be described in connection with FIG. 2. The circuitry and the detector housings in FIG. 2 can be identical to those disclosed in connection with FIG. 1. For this reason the electrical circuit has been omitted from FIG. 2.

Figure 2:
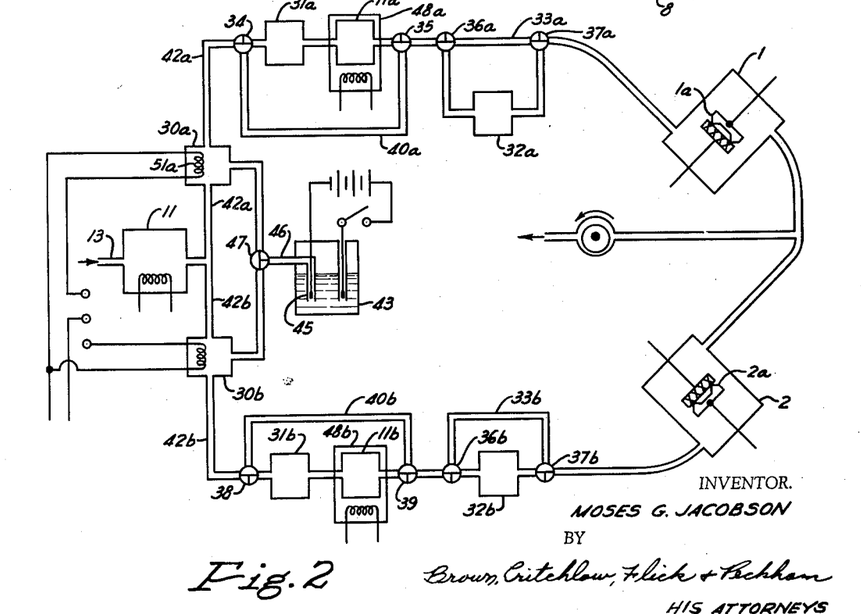
FIG. 2 shows a gas detector, omitting the circuitry, which shows associated apparatus by which ambients can be conditioned through physical and chemical means for subsequent detection of a component thereof.

Non-polar substances do not affect semiconductor diodes as do polar compounds; they either have no effect at all or it is too minor to measure. My method of detecting these materials relies on certain physical and chemical steps that are taken in connection with preparing the samples prior to admitting them to the housings 1 and 2. The methods employed in this instance comprise converting all or a substantial part of the non-polar fluorine-containing molecules present in the sample of ambient undergoing test into a compound that has a substantial polar moment and thereby exerts an effect on the electrical properties of diodes as hereinbefore disclosed.

The conversion of the non-polar component to a polar component can be carried out in several ways and the apparatus as disclosed in FIG. 2 is a composite apparatus by which many of these methods can be practiced. Examples of this conversion include burning or pyrolyzing the non-polar substance, to split off fluorine, in the presence of water vapor thereby to produce hydrofluoric acid. Hydrolysis also can be accomplished in the presence of a catalyzing agent. An additional method involves reacting the non-polar component with hydrogen, particularly nascent hydrogen as produced by an electrolytic cell, to split out the fluorine and produce HF, a polar material.

In using the apparatus shown in FIG. 2, the gas ambient enters through inlet conduit 13 and immediately passes into humidity stabilizing vessel 11, shown diagrammatically, that may be of a construction identical to that disclosed in connection with FIG. 1. The gas leaving the humidity stabilizer is divided into two parts, one going through conduit 42a towards detectors housing 1 and the other through conduit 42b towards detector housing 2.

Since the apparatus in line 42b is the same as that in line 42a, only the latter will be described, it being understood that the corresponding unit is in the lower 42b line. The ambient entering conduit 42a first passes to reactor 30a, where it is hydrolyzed, pyrolyzed or otherwise treated depending on the choice of the operator, to convert at least part of the fluorine content of the non-polar ambient to hydrofluoric acid. A heating element 51a, capable of burning or decomposing the fluorine-containing component, is located in the reactor, and can be energized by a power source (not shown). The burning of the fluorine-containing material in the presence of water vapor, present as a consequence of the sample passing through the humidity stabilizer 11, will result in hydrofluoric acid. Since hydrofluoric acid is a polar compound, it can be detected in accordance with the process as described in connection with FIG. 1, above.

For those instances where it is desired to react the non-polar component with hydrogen, to produce the hydrogen fluoride, a source is provided that can feed hydrogen into reactor 30a. In the embodiment shown, the hydrogen is generated by a conventional electrolytic cell 43. The hydrogen generated is conducted away from the cathode 45 by a conduit 46. Valve 47 is provided to distribute the hydrogen to reactors 30a and 30b, or either of them or to seal off the cell when it is not in use.

Reactor 31a is adapted to hydrolyze the ambient sample when that method of conversion is preferred to pyrolysis or other conversion accomplished with reactor 30a. In this instance, the sample is permitted to pass through reactor 30a without change. Occasionally, reactors 30a and 31a can be used at the same time to bring about greater conversion than may otherwise be possible. In any of these conversions, the humidity content of the sample also undergoes a change. Consequently, a second humidity stabilizer 11a is placed in the stream conduit after reactor 31a. In view of the fact that the semiconductor detectors are of only slightly greater sensitivity for hydrofluoric acid than for water vapor, it may be advantageous to stabilize the humidity at this stage at a lower value than in stabilizer 11 where the calibration curve is steeper. Accordingly, different solutions normally would be used in stabilizers 11 and 11a. For example, a saturated solution of calcium nitrate tetrahydrate, [$Ca(NO_3)_2 \cdot 4H_2O$], in stabilizer 11 would provide a humidity of 51 percent at 24.5 C., while a solution of calcium chloride hexahydrate, [$CaCl_2 \cdot 6H_2O$], resulting in a humidity of 35 percent at 20° C. can be placed in stabilizer 11a (and 11b). At lower humidities and where there is not a very great difference in sensitivity between water vapor and the compound being detected, e.g. HF in this instance, finer temperature control generally is practiced. Accordingly, it has been found convenient to surround stabilizers 11a and 11b with thermally insulated housings 48a and 48b respectively.

The use of a second humidity stabilizer 11a (or 11b) is advantageous for other reasons. For example, in certain instances in the conversion of non-polar components to polar molecules, substantial quantities of water vapor can be formed, as in the combustion of hydrocarbon base materials. As noted before, water vapor may interfere with the detection of other polar compounds, and when its concentration is increased in the presence of hydrogen fluoride, or the like, detection would be difficult if possible at all. Stabilizer 11a, however, can be used in that event to reduce the water vapor content to the standard value used in the test prior to conversion of the sample, thereby eliminating effects of the additional water vapor produced.

Similar to the practice of the invention in conjunction with FIG. 1, it is advantageous and sometimes essential to remove the component being detected from the gas sample in order to make adjustments and balance the bridge. Selective filters 32a and 32b are provided for that purpose and they are adapted to be selective for the removal of HF. Glass wool or quartz wool provides a high degree of selectivity and can be used in those filters. However, soda lime or bubblers with alkaline solutions may also be used.

By providing a by-pass 40a around reactor 31a and humidity stabilizer 11a controlled by valves 34 and 35, and a similar by-pass 40b around the corresponding reactor 31b and stabilizer 11b in line 42b, the latter controlled by valves 38 and 39, those units need only be used when desired. For similar flexibility, a by-pass conduit 33a controlled by valves 36a and 37a is available around selective filter 32a while conduit 33b and valves 36b and 37b serve the same function for filter 32b.

An example of using FIG. 2 is as follows: The Wheatstone bridge, or other circuit, containing detector elements 1a and 2a is balanced with the fluorine-containing component in both the upper (42a) and lower (42b) gas streams being partly converted to HF and both humidity stabilized, e.g. at 35 percent humidity. Then valves 36a, 36b, 37a and 37b are adjusted so that the samples are passed through filters 32a and 32b where the hydrofluoric acid is selectively removed. The resultant samples, which are free from HF, are then passed through the detector housing and the bridge balanced again. Then, with the sample in 42b being passed through the selective filter 32b in that line, valves 36a and 37a are turned so that the sample in line 42a by-passes filter 32a. Accordingly, HF will be delivered to detector 1a while detector 2a is still deprived of it. The meter will now indicate a deflection corresponding to the amount of hydrofluoric acid present. By means of previous calibration with known concentrations of HF, the meter reading can be readily evaluated.

It is evident upon considering the above-described operation of the apparatus of FIG. 2, that the manner of producing the polar HF from the non-polar fluorine-containing component is not of particular significance in detecting that material. Accordingly, reactors 30a and 31a as well as 30b and 31b can be of any nature found to bring about the desired hydrofluoric acid production. It should also be apparent this type apparatus is more convenient to use where it is unknown, at the beginning of a test, whether or not the fluorine-containing component tested has a strong polar moment. In that instance, the reactors in each line can remain inactive and the sample tested as in connection with FIG. 1. If a satisfactory result is not achieved, the fluorine-containing component can be converted to HF in reactor 30a or 31a (and in the corresponding reactors 30b and 31b) as just described and a measurement made.

For some purposes, rapid changes in testing for polar and non-polar fluorine-containing molecules is desirable. For this preferred embodiment it is advantageous to have all reactors of a substantially electrical nature such, for example, as pyrolyzers functioning to decompose or react the fluorine-containing component at an incandescent wire or in an electric discharge gap or the like. In that manner, the conversion can be started or stopped in a matter of but a few seconds. Consequently, it becomes possible to change from a standard to a converted sample at either or both detectors merely upon operating one or two electrical switches, which may be operated automatically by a motor driven cam or other mechanical linkage.

While FIGURE 2 has been described in connection with the detection of polar and non-polar fluorine-containing molecules, it should be understood that other compounds such, for example, as any other halogen-containing compound can be detected in similar fashion. Examples of other halogenated compounds include the halogenated hydrocarbons, freons and the like. Where such other materials are to be detected, preliminary calibration and experience can be obtained by use of known standardized gas mixtures.

The discussion of the invention in conjunction with FIGURES 1 and 2 has not specified particular detector constructions. The detectors disclosed in my earlier applications can be used. However, I have developed additional structures that comprise the preferred detector embodiments for purposes of the present invention.

Figures 5, 6:
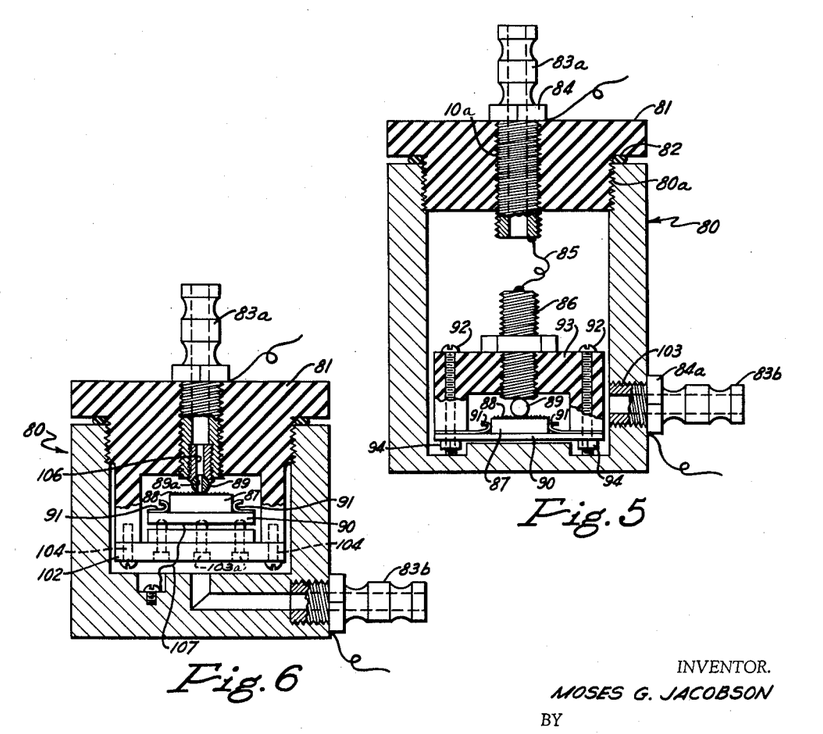
FIG. 5 illustrates a diode construction that may be used in practicing the present invention.
FIG. 6 illustrates the diode of FIG. 5 in modified form.

Referring now to FIG. 5, there is illustrated a first form of novel detector cell construction. In this embodiment, the boundary or junction is, essentially, a point contact between a steel ball 89 and a layer 88 of a semiconductor material, e.g. germanium. It has been determined experimentally that such a contact, particularly where a steel ball is used, is especially good in detecting nerve gases, hydrogen fluoride and other fluorine-containing substances. Generally, the steel ball is on the order of 1/16 to 1/8 inch in diameter, such as the familiar ball bearings. With the point contact made by means of the steel ball, a relative large contact area with maximum accessibility to gases to be tested is provided. The symmetry of the ball permits the test gas to approach the contact or junction quickly and easily from any direction with the same facility and excludes resistance changes caused by angular dislocations.

The semiconductor layer or wafer 88 (generally 50 to 100 microns thick) is carried on a conducting base 87 which, in turn, is held to a metal base plate 90 by the pressure of springs 97 at its sides. Conducting base 87 can be made of metal or be a graphite or carbon block.

The steel ball 89 is held against the upper surface of the semiconductor 88 by means of a conducting terminal post 86 which is threaded through an inverted U-shaped bracket 93 made of a suitable insulating material. Nuts 94 and screw bolts 92 are provided to attach the bracket 93 to the base plate 90 as well as to retain springs 91 in place. This assembly is located in the lower portion of a hollow, cylindrical metal housing indicated generally by the numeral 80. The housing 80 includes a cover or top wall 81 formed of insulating material and threaded into the side walls of the housing as indicated at 80a. A gasket 82 provides a fluid tight seal between the side walls and cover 81. The cover 81 is also provided with a central threaded bore 10a for accommodating an externally threaded tubular member 83a, made of metal, which is connected to a gas supply (not shown) in order to deliver gases to the interior of the housing 80. A lock nut 84 is secured about member 83a in order to position the latter relative to the cover 81. A second tubular member 83b is threaded through a threaded bore 103 in a side wall of the housing 80 adjacent the semiconductor element 88. This tubular member 83b, which is also provided with a suitable lock nut 84a, serves to conduct gases out of the housing after contact with the junction at the semiconductor.

The conducting terminal post 86, which retains the metal ball 89 in place against the semiconductor layer, also serves as part of the electrical circuit through the device. For this purpose, one end of a conductor 85 is soldered to the upper surface of the post 86. The other end of the conductor is similarly attached to the lower portion of tubular member 83a. The electrical circuit is completed by attaching leads, from a current source, to the lock nuts 84 and 84a. Hence, current can flow through a lead into lock nut 84a, then to the housing 80 which is in contact with bolts 92, then into springs 91 to the base 87. The semiconductor layer 88, steel ball 89, post 86, conductor 85, tubular member 83a and lock nut 84 complete the internal circuit involved.

Gas flow in this cell is through conduit 83a, down to the contact area both from in front of and back of the U-shaped bracket 93. Reverse flow could be used as well.

FIGURE 6 shows a second embodiment of a detector cell. In this embodiment, the semiconductor layer 88 is supported on a block 87 of carbon or similarly conductive material which, in turn is held on a base plate 90 by springs 91. Plate 90 is attached to an insulating member 102, by screws 103a, and member 102 is attached, by screws 104, to the cover 81 of the housing 80.

Contact is made with the semiconductor layer 88 by steel ball 89. The ball has a small vertical bore 89a through it so that gas can be delivered about its point of contact with the semiconductor layer 88. Steel ball 89 is held against the semiconductor layer by a tube 106, screwed into the lower end of conduit 83a. Tube 106 thereby serves simultaneously as a terminal post as well as an inlet conduit. The ball as shown closes the opening of tube 106 in a substantially fluid tight manner, so that a most direct and substantially single path access of test sample to the contact area with the semiconductor is provided through bore 89a.

A conductor 107 attached to the bottom of housing 80 and to base plate 90 serves to complete the electrical circuit in the lower end of the housing.

In addition to the advantages stated above, the ball contact detectors are further advantageous in that the geometrical symmetry of the ball renders the device largely insensitive to variations in the contact characteristics as a consequence of small tilting displacements of either electrode. Particularly accurate adjustment of the contact pressure in these two embodiments is readily achieved by means of screws 92 and 103a for FIGURES 5 and 6 respectively.

The fewer number of parts necessary in FIGURE 6 and the fact that it is more readily assembly make it a design that is of greater preference than that of FIGURE 5.

The absolute resistance of the exposed boundary of the detector changes in response to variations in temperature, excitation voltage and the like. To minimize the effects of these variations, a compensating device having an exposed boundary similar to the exposed boundary of the detector in its resistance versus voltage characteristics as well as its resistance versus temperature characteristics, generally is used. In this connection it should be mentioned that the absolute reverse resistance as well as the forward resistance of the detector boundary varies considerably with temperature, thus necessitating the use of a compensating device having a boundary with similar characteristics. However, the effect of temperature on the gas and vapor sensitivities (percent resistance change for each percent of concentration change) is small and does not have a uniform trend and, as a consequence, compensation alone by means of a semiconductor device having a sensing element similar to the detector sensing element without elaborate means for keeping the temperature of the semiconductor devices constant, is sufficient for practical purposes.

To carry out this simple compensation scheme, the compensator sensing element or semiconductor device may be surrounded by a standard atmosphere in a hermetically sealed container. However, in testing of gases—especially when the temperature, etc. of the gases being tested varies considerably and rapidly, it is often preferable to subject the compensating sensing element to the same sample flow as the detector gas. To make this possible it is necessary to deprive the compensator element completely or at least to a very substantial degree of sensitivity to the components tested for. This is accomplished by connecting the compensator boundary in the circuit in such a way that it is traversed by electric current flowing in the opposite direction from the current passing through the detector boundary. It has been found that semiconductor diodes or boundaries usually have negligible sensitivity to electroactive components when polarized in the forward direction, while they exhibit very similar resistance changes resulting from variations in temperature, applied voltages, etc. regardless of the direction of current flow through the boundary. Therefore, this scheme provides a very effective, quick acting compensation against variations in applied voltage, fluid temperature, fluid flow and other similar conditions.

Figure 8:
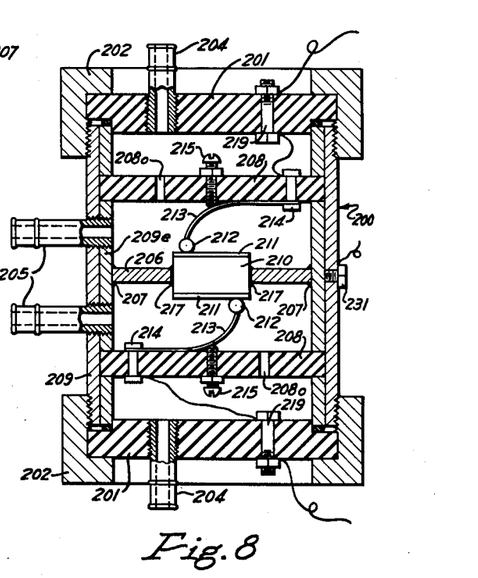
FIG. 8 illustrates a detector construction in which two diodes on a common base and of substantially similar characteristics are used in two separated parts of a common housing.
Figure 9:
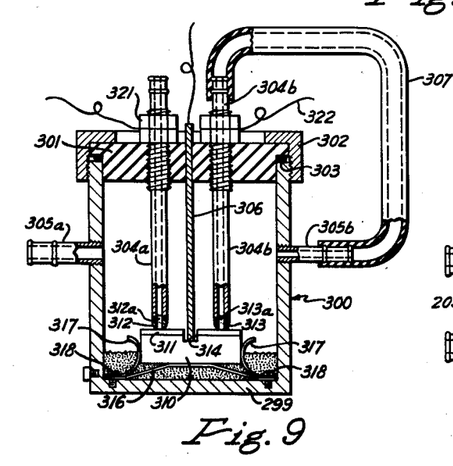
FIG. 9 illustrates a second embodiment in which two diodes on a common base and of substantially similar characteristics are provided in separate compartments of a common housing.

In accordance with the foregoing considerations, it is evident that the detector and compensator semiconductors should be as similar to one another as is practical, located as close to each other as possible and adapted to admit electric current of opposite polarities. In FIGURES 8 and 9, I have shown two particularly useful structures that can function as detector-compensator units.

Referring now to FIGURE 8, the semiconductor portions of the detector-compensator are formed using a common carbon or graphite block 210 located centrally within a housing generally indicated by the numeral 200. Block or base 210 is supported within the housing by use of a solid annular conducting member 206 that can be soldered to the inside wall 209e, which is enclosed by outside wall 209, of housing 200 as indicated by the numeral 207. The block 210 is soldered along its periphery to conducting member 206 by solder deposits 217. The solder deposits 217 and 207 must be sufficient to provide gas tight connections in addition to good ohmic contacts, especially at the base 210. Conducting member 206 thereby serves to isolate or separate housing 200 into two compartments.

On the upper and lower surfaces of block 210 are similar layers 211 of a semiconductor material, such as germanium or silicon or other conventional semiconductor material. The deposition of the two semiconductor layers 211 on block 210 has been performed in a single coating procedure. Since all parts of the resulting structure have been subjected to substantially the same high temperature for the same period of time as well as to the same cooling and quenching procedure, if any, the two semiconductor coatings will be practically identical in their electrical properties. Moreover, the common base 210 assures equal conditions of heat and electrical transfer to the two semiconductor layers.

Contact is made with each semiconductor layer with steel balls 212. These balls are physically attached to spring members 213 which in turn are attached by means of metal bolts 214 to circular insulating members 208. Adjustable screws 215, threaded through each of the circular insulating members 208, are provided with their end in contact with spring member 213. Accordingly, by adjusting these screws, the pressure with which the balls are urged against the semiconductor layers can be adjusted as desired and equalized. Passages 208o are provided through insulating members 208 to allow free passage of gases.

Housing member 200 suitably is generally cylindrical in shape. It is provided with lower and upper end walls 201 made of insulating material. The walls are maintained against the ends of side walls by means of annular caps 202 that are threaded and thereby mate with the corresponding threaded portions at the ends of the side wall 209 of the housing. Each end wall has a tubular member 204 extending therethrough. Tubular conduit members 204 can be permanently placed in the end walls as shown or, if desired, can be provided with external threads (not shown) which engage threads (not shown) through holes in the end walls provided for that purpose. Tubular conduits 205 are placed in the side wall 209, in generally the same fashion as conduits 204. Conduits 205 are placed on each side of conducting member 206, as close as is convenient. Generally, gas flow is through conduits 205 into the compartments; it exits through the conduits 204 in the end walls.

Since each of the semiconductor layers 211 is electrically connected to the spacing conducting member 206, it has been found convenient to use member 206 to provide electrical connection to the semiconductors. Accordingly, one lead is attached, electrically, to member 206 by metal screw 231 extending through the side wall 209. The other leads to the unit are attached to springs 213 through bolts 214 by conductors extending from bolts 214 to conducting bolts 219 that are placed through the end walls 201.

Many modifications of the structure in FIGURE 8 will be apparent upon consideration of it along with the foregoing description. One particular modification that is advantageous is to use a single solid germanium or silicon crystal in place of the carbon block with its two semiconductor layers, for even greater identity between the detector and compensator can be obtained.

FIGURE 9 shows a second embodiment of a combination detector-compensator unit. In this embodiment, two parts of a single semiconductor element serve in forming the detector and compensator of the unit.

Referring now to FIGURE 9, a single semiconductor layer 311 is provided on a block 310 of carbon or graphite supported in the lower end of a cylindrical housing 300. The carbon block 310 is maintained in its position by use of suitable metal spring 317 along its sides and a spring supporting means 316 at its bottom. These springs are attached to the lower end wall 299 of the housing 300 by use of metal screws 318. Housing 300 is a hollow cylindrical metal device, with a metal bottom 299, that is closed by means of a top end wall 301 made of an insulating material. The top wall 301 is removable and is retained in place by use of an annular boss member 302 that threadably engages the upper end of the side wall of the housing. A gasket 303 is provided to secure the requisite seal within the housing.

A metal dividing member 306 extends centrally of the cylindrical housing dividing it into separate semicylindrical compartments. The dividing element is of a size and shape to fit tightly within the housing. Its upper end extends through the insulating top wall 301 while its lower end is recessed into the carbon block 310. To receive the dividing element 306, a slot 314 slightly larger than the thickness of dividing member 306 is cut into the carbon block in such a manner that the layer of semiconductor material 311 on its top is completely cut apart and that the dividing element 306 makes no contact with either of the semiconductor coatings.

The rectifying junctions that serve as the detector element and the compensating element in this embodiment are formed by the contact of steel balls 312 and 313 on the surface of the two parts of semiconductor layer 311. These steel balls are provided with bores 312a and 313a respectively, as described before, for bringing gas to the contact point. The balls are held in place by the use of hollow metal tubes 304a and 304b that extend from outside the device through the top wall 301 down to the balls as shown. Tubes 304a and 304b also serve as gas conduits for the two chambers. The chambers are also provided with gas outlet tubes 305a and 305b. The internal part of the structure is completed by packing under and around carbon block 310, wax or other non-conducting material that can effectively complete the seal between the two chambers of the housing.

Since a compensator frequently is used with a sealed atmosphere, a rubber tube 307 or equivalent means can be attached to the external ends of gas tubes 304a and 305a. Then gas in the chamber containing the compensating element is effectively sealed. This tube would be omitted where it was desired to use a flowing ambient in that chamber.

When the compensator and detector elements are to be used with the same polarity, current is fed to the semiconductors by means attached to dividing member 306. As the current reaches the base or block 310, it divides into two parallel branches. One branch leads through block 310 to terminal 321 through the steel ball 312 and tube 304 in the detecting chamber while the other leads to the terminal 322 through steel ball 313 and tube 304a in the compensating chamber.

When the compensator and detector are to have opposite polarities, they are connected in series by leading the current in at lead 321 and out at lead 322, or in at lead 322 and out at lead 321. The dividing member 306 is then used only as a connection to the diagonal meter branch of a bridge circuit or a voltage measuring device from the connecting point 314 between the detector and compensator elements.

Figure 10:
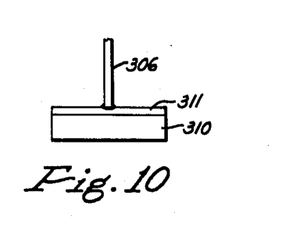
FIG. 10 illustrates a modified structural detail of the device shown in FIG. 9.

Various modifications can be made in the device just shown without departing from the scope of this invention. For example, current can be fed to the semiconductor elements by an ohmic contact between the dividing member 306 and the semiconductor layer 311. This can be accomplished as shown in FIG. 10 by simply omitting the slot 314 in the block 310 and extending the divider member 306 only to the surface of the semiconductor layer 311. By suitable soldering in the conventional manner an ohmic contact can be provided. In this embodiment, it is evident that block 310 may be made of an insulating material rather than be of carbon or the like. Current carried by member 306 would then divide upon contacting the semiconductor layer 311 and be distributed as before. Or, in the series connected arrangement, member 306 would, as before, serve as a lead to the connecting line between the two diode elements, polarized in opposite directions.

It has been noted above that the sensitivity to water vapor of a detector diode is but a little lower in the forward direction than in the reverse direction. It has also been noted that the sensitivity to water vapor increases with voltage very slowly and reaches a maximum at relatively low voltages. On the other hand, sensitivity to such substances as polar fluorine-containing molecules is either very small or entirely absent when the diode is polarized in the forward direction. The sensitivity to polar fluorine-containing molecules of the diodes biased in the reverse direction is higher than for water vapor and increases with voltage much faster than for water vapor. Using these principles it is possible to combine a detecting element consisting of a semiconductor diode polarized in the reverse direction with a compensator diode comprising a similar diode polarized in the forward direction and enclose them in a common housing where they can be subjected to the very same gas sample. Under these circumstances the effects of humidity would be equalized with a much greater degree of accuracy than would be possible where the diodes were in separate housings.

When attempting the foregoing while using a balanced circuit, such as a Wheatstone bridge, a difficulty arises. The detector, which is biased in the reverse direction, must be used at a relatively higher voltage than a similar diode serving as a compensator and biased in the forward direction. When low voltages are used, that would be sufficient and safe to pass current in the forward direction, the sensitivity for the test gas would be very low. To use the higher voltage that is most suitable for detection and apply this to the compensator diode polarized in the forward direction would encounter the risk of burning out that diode or render it unstable by overloading and therefore unreliable. Upon attempting to match current between a single rectifier diode polarized in the forward direction with a similar diode, serving as a compensator, biased in the reverse direction similar considerations arise.

These difficulties can be overcome by using a plurality of diodes, series or parallel connected, to serve as the compensator. When the series connection is used and the entire group is matched in voltage with the detecting element, the voltage applied to each of the compensator diodes is but ½, ⅓, ¼ or so on, depending upon the number present. By choosing the appropriate number of diodes for detection or compensation or both, the voltage most suitable for the best change in diode characteristic being measured, considering the component being detected and the interfering component present, can be used. A typical embodiment in which this arrangement may be used is shown diagrammatically in FIGURE 3.

Figure 3:
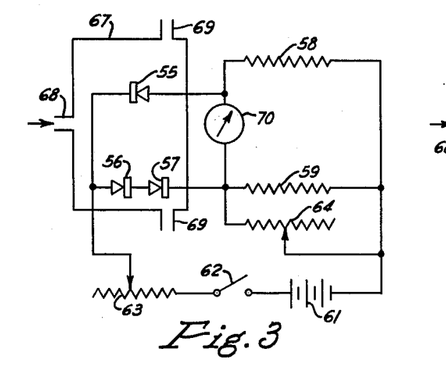
FIG. 3 shows schematically a detector and compensator assembly and electrical circuit for carrying out this invention in which a plurality of semiconductors are subjected simultaneously to an ambient.

Referring now to FIG. 3, the diodes 55, 56 and 57 are disposed in a housing 67. These diodes serve as two of the arms of a Wheatstone bridge circuit. Thus, diode 55, serving as a detector forms a first arm of the circuit, diodes 56 and 57, which are in series and serve as a compensator, form a second arm, fixed resistance 58 forms a third arm and the fourth arm is composed of a fixed resistance 59. Battery 61 supplies the unidirectional current for the bridge and is provided, on one side, with a switch 62 and a variable resistance 63. Microammeter 70 and a variable resistance 64, the latter being in parallel with arms 58 and 59 to aid in fine adjustment of the bridge, complete the circuit.

In this embodiment, the test gas enters the housing 67 through an inlet conduit 68. Since the detector and compensator diodes are resident therein, the same gas sample is brought to bear on each of those elements. Conduits 69 are provided to permit the gas sample to be withdrawn.

Figure 4:
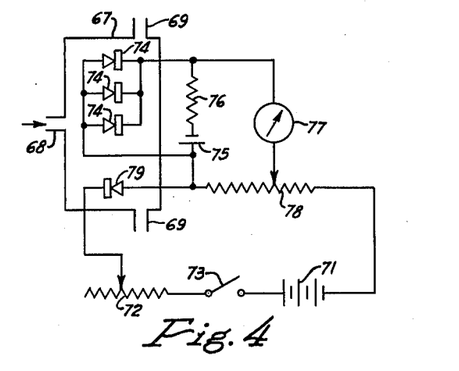
FIG. 4 illustrates another embodiment of a detector-compensator assembly wherein a plurality of semiconductors are simultaneously contacted with a sample of an ambient.

The use of the detector and compensator in the same housing is not restricted to a series connection for the compensator diodes nor to the use of a Wheatstone bridge circuit. FIG. 4 shows, diagrammatically, a parallel connection of compensator diodes and a potentiometer type circuit.

Referring now to FIG. 4, diodes 74 are parallel connected with each other and with a dry cell 75, and a resistor 76 in series thereto, in the compensated loop of a potentiometer type circuit. That includes also, in series with the above, the microammeter 77 and the variable part of potentiometer rheostat 78, which is common both to the compensated as well as the compensating loop. The latter is composed of battery 71, switch 73, variable resistance 72, detector diode 79 and potentiometer rheostat 78 all in series. As shown in the drawing, the detector diode 79 is biased in the reverse direction, while the compensating diodes all are biased in the forward direction. All diodes are in a common housing 67 and accordingly are contacted with the same gas sample, which is admitted through inlet conduit 68 and leaves at outlet conduits 69.

Figure 11:
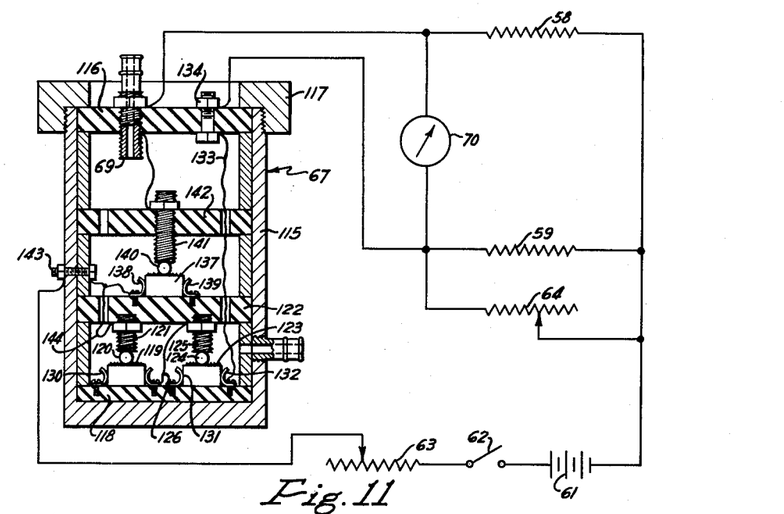
FIG. 11 is a structural embodiment of the design shown schematically in FIG. 3, including three semiconductor diodes subjected simultaneously to the same ambient and arranged in two groups for inclusion in adjacent arms of a bridge circuit.

In FIGURE 11 is shown a typical housing containing a detector diode and a pair of diodes series connected that serve as a compensator and in which all diodes are subjected to the same gas sample. The diagrammatic circuit associated with the housing is identical to that discussed above in connection with FIGURE 3 and therefore will not be repeated. The diodes are indicated generally by the numerals associated therewith in FIGURE 3.

The housing 67 is an open end, generally cylindrical, metal container 115 having a removable top end member 116 formed of a suitable insulating material. The top end wall is retained on the cylindrical housing by an annular cap 117. Compensator diode 56 is placed on an insulating block 118 at the bottom of the housing and is composed of an N type semiconductor block 119 with a steel ball 120 contact on its upper surface. The ball is maintained in place by metal tube or rod 121 affixed at its upper end to an insulating beam 122 extending across the chamber. Compensator diode 57 is composed of a similar N type semiconductor block 123 and a steel

17 ball 124 at its upper surface. Ball 124 is retained in place by metal rod or member 125 affixed to the same beam 122 as is member 121. Conductor 126, extending from semiconductor block 119 to metal rod 125, serves as an electrical series connection between the two diodes, and springs 130, 131 and 132, all of which are removably attached to the insulating base 118, are the means for retaining the N type semiconductor blocks in place. Spring member 132 serves the additional function of connecting to an electrical lead 133 that leads out of the housing 67 through bolt 134 in the upper end wall 116 and connects to the lead from the lower side of the meter 70 and bridge arm 59.

The detector diode 55 is composed of an N type semiconductor block 137, that is substantially the same as blocks 119 and 123, and is retained between springs 138 and 139 on the upper surface of beam 122 hereinbefore mentioned. Its steel ball contacting member 140 is urged against its upper surface by a metal rod or member 141 that is affixed in a second insulating beam 142 extending across the housing above this diode. Voltage is applied to this diode 55, in the reverse direction, through spring 138 which is attached to a metal bolt 143 extending through the side wall of housing 67. A second lead 144 from bolt 143 is attached to metal member 121 and thereby provides a forward bias on the compensator diodes 56 and 57. The electrical circuit is completed by attaching a lead from member 141 to metal inlet conduit 69 which in turn is attached to the lead from the upper side of meter 70 and bridge arm 58.

Figure 12:
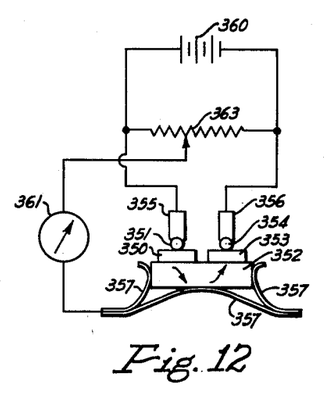
FIG. 12 shows a circuit together with semiconductor diodes in which compensation against the effects of water vapor can be accomplished with a single diode polarized in the forward direction.

The use of a plurality of diodes to serve as a compensator for water vapor as above described represents the preferred embodiment of that aspect of the invention. However, it should be understood that it is possible to provide a detecting diode with but a single diode biased in the forward direction as a compensator providing a suitable electric circuit is used; a diagrammatic representation of such an arrangement is shown in FIGURE 12.

The compensator diode is formed of a block of semiconductor material 350 and a steel contact member 351, on its upper surface. The block is placed on a conducting base 352 composed of carbon or graphite or the like. Spaced from the compensator diode on the conducting base 352 is the detector diode, which is formed of a similar semiconductor material 353 and a steel ball contact member 354. The steel ball contacting members of each diode are held in place by tubular members 355 and 356, having inside diameters slightly less than the diameter of the balls as in the other embodiments. The entire structure of the two diodes and their base can be enclosed in a housing (not shown) with a gas inlet and outlet similar to those described above in connection with the other embodiments, and the metal springs 357 that hold the base 352 are then attached to the bottom of the housing by screws or in any other suitable manner. A battery 360 is series connected with these two diodes, the positive pole of the battery leading to the metal contact of the compensator diode, which thus is biased in the forward directions as in FIG. 3. The positive current then goes through diode 353—354 from the germanium semiconductor 353 to the steel ball 354, which thus is biased in the reverse direction as required for detector action. A microammeter 361 is connected between an adjustable slider or tap of resistor 363 of low resistance and high current capacity that is connected across the battery and the area in the base where the current leaves the compensator and enters the detector. The tap on resistor 363 being substantially nearer the left terminal as shown in the drawing, it will be evident that the biasing voltage across the compensator diode is lower than the voltage across the detector diode. Meter 361 in this arrangement is preferably a low resistance meter with a suppressed zero. While it is possible with this and other circuit arrangements to obtain compensa-

18 tion against water vapor interference with a single diode compensator, applicant has found that this is always accompanied by a substantial loss in sensitivity. On the other hand, by using the circuits employing two and more compensator elements, no loss in sensitivity is incurred and therefore the use of two or more compensator elements for compensation against changes in water vapor content is much to be preferred.

In the foregoing discussions relative to detector-compensator diodes, specific embodiments of the invention have been disclosed that have included the novel rectifying diodes that I have developed. It should be understood that other diodes, such as the permanent junction type diodes now used in large quantities for other purposes, can be used in this invention. Typical novel embodiments of permanent junction type diodes to serve as detector and compensator diodes in accordance with this invention are shown diagrammatically in FIGURES 13 and 14.

Figure 13:
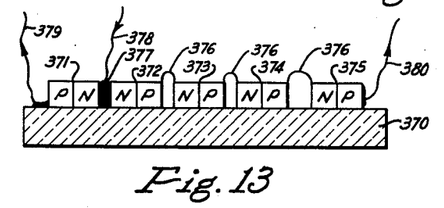
FIG. 13 shows a device by which several compensator diodes in series can be combined with a single semiconductor detector element in a composite unit for use in apparatus of the present invention.

The diode device in FIGURE 13 includes five diodes attached to a common base 370 made of an insulating material such as quartz, glass or the like. Diode 371 is the detector diode while diodes 372, 373, 374 and 375 are the compensator diodes. The compensator diodes are physically spaced from one another, as shown, to avoid creating additional junctions. Those diodes are, however, electrically connected as by suitable conductors 376 from the P side of one diode to the N side of the next adjacent diode. The detector diode 371 is electrically connected to the adjacent compensator diode 372 by an ohmic contact 377 where a common current inlet 378 is affixed. Outlets 379 and 380 are soldered, or otherwise attached by ohmic contacts, to the ends of the units.

Figure 14:
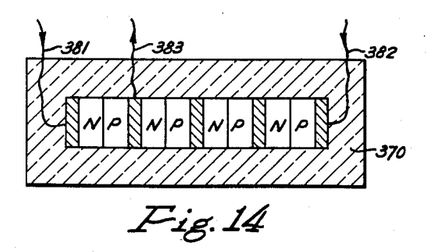
FIG. 14 is similar to FIG. 13 and represents a second arrangement of multiple compensators with a single semiconductor detector element.

FIGURE 14 shows a similar arrangement of detector and compensator diodes that distinguishes from that of FIGURE 13 essentially only in that the end terminals 381 and 382 are current inlets and conductor 383 is a common outlet for both the detector and the compensator.

The devices of FIGURES 13 and 14 are conveniently prepared by attaching a thin strip of N type semiconductor material, such as germanium or silicon, to an insulating base 370, of quartz or glass. Then at equal intervals, a number of cuts are made completely through the semiconductor layer. The strip is covered with a comb-shaped mask so that alternate pieces of the strip are masked. By subjecting the resulting unit to irradiation by X-rays or radiation from a nuclear reactor, the exposed portions of the semiconductor are converted to P type in the known manner. Alternatively, small quantities of acceptor materials, such as gold or indium, can be melted on the exposed portions of the semiconductor, while the remainder is masked or cooled, thereby converting the areas to P-type by diffusion. When the mask is removed, the gaps can be connected by soldered wires or filled with metal to make suitable ohmic contacts.

The advantages of the above embodiments include the ease of manufacture and economics. In addition, those diodes have great stability against shock and vibrations. Moreover, a larger number of diodes are easily series interconnected so that the voltage applied to each becomes smaller and the effect of polar substances correspondingly decreased.

According to the provisions of the patent statutes, I have explained the principle of my invention and have illustrated and described what I now consider to represent its best embodiments. However, I desire to have it understood that, within the scope of the appended claims, the invention may be practiced otherwise than as specifically illustrated and described.

I claim:

1. A method for detection and concentration measurement of organic halogen-containing compounds in an ambient comprising the steps of exposing part of the boundary between two dissimilar materials at least one of which is a semiconductor forming a rectifying diode to an ambient containing a halogen-containing compound while said diode is subjected to a voltage of predetermined polarity and magnitude for said compound being detected, and measuring an electrical characteristic of said diode, then subjecting said ambient to means to convert halogen-containing compounds therein to hydrogen halide, exposing said boundary to the thus treated ambient and measuring the change in said electrical characteristic at said predetermined applied voltage.

2. A method according to claim 1 in which said halogen is fluorine and said halide is fluoride.

3. A method according to claim 2 in which said ambient is pyrolyzed in the presence of free hydrogen to form hydrogen fluoride in said means.

4. A method according to claim 2 in which said ambient is reacted with hydrogen chloride to form hydrogen fluoride in said means.

5. A method according to claim 1 in which said ambient is hydrolyzed in the presence of water vapor in said means.

6. A method according to claim 5 in which said thus treated ambient is treated to adjust its humidity to the humidity content in the ambient prior to converting the halogen-containing molecules to hydrogen halide.

7. A method for detection of polar, organic molecules in an ambient comprising dividing a sample of an ambient into two streams and passing the resulting streams into contact with two substantially similar rectifying diodes, each diode being formed of two dissimilar materials one of which is a semiconductor, maintained in separate enclosures, said diodes being electrically interconnected with means to measure the difference in an electrical characteristic of said diodes, observing the difference in said electrical characteristic while said streams are in contact with said diodes, then subjecting one of said streams to means for selectively decreasing the content of polar organic molecules therein, and again observing the difference in said electrical characteristic of said diodes while said unchanged stream is in contact with one of said diodes and the treated stream is in contact with the other of said diodes.

8. A method according to claim 7 in which said polar molecules are fluorine-containing molecules.

9. A method according to claim 8 in which said content of fluorine-containing molecules is decreased by pyrolyzing said molecules to hydrogen fluorine and selectively absorbing said hydrogen fluoride therefrom.

10. A method in accordance with claim 7 in which said polar organic molecules are molecules of a fluorine-containing nerve gas and said ambient sample is stabilized at a predetermined humidity prior to dividing it into two streams.

11. A method in accordance with claim 10 in which humidity stabilization is effected by passing said ambient through a liquid having a pH of 1 to 7.

12. A method for detection of halogen-containing molecules in an ambient comprising dividing a sample of an ambient into two streams and passing the resulting streams into contact with two substantially similar rectifying diodes, each diode being formed of two dissimilar materials one of which is a semiconductor, while said diodes are subjected to a predetermined voltage for said halogen-containing molecules and are connected in a circuit adapted to measure a difference of electrical resistance of said diodes, observing the difference of resistance while said streams contact said diodes, subjecting one of said streams to means to decompose said halogen-containing molecules and produce a corresponding quantity of hydrogen halide, reintroducing the resulting stream to one of said diodes while the other stream contacts said other diode, and observing change in the difference of electrical resistance of said diodes at said predetermined voltage.

13. A method in accordance with claim 12 in which said halogen is fluorine and said halide is fluoride.

14. A method according to claim 13 in which said hydrogen fluoride is produced by pyrolysis.

15. A method according to claim 13 in which said hydrogen fluoride is produced by reacting said fluorine-containing molecules with hydrogen chloride.

16. A method for detection of polar, organic, fluorine-containing molecules in an ambient containing water vapor comprising contacting two rectifying diodes, each diode formed of two dissimilar materials at least one of which is a semiconductor, while said diodes are in a balanced circuit and are polarized in opposite directions at a predetermined voltage for said fluorine-containing molecules, with a sample of said ambient from which said fluorine-containing molecules have been selectively removed and balancing any imbalance of said circuit, then contacting said diodes with said ambient containing said fluorine-containing molecules and observing the degree of imbalance of said circuit.

17. In a method for detecting non-polar components in an ambient that also contains an interfering polar component the steps comprising passing a sample of said ambient through means adapted to reduce the concentration of said interfering component to a standard value, exposing a rectifying diode, composed of two dissimilar materials at least one of which is a semiconductor, to said sample while said diode is subjected to a predetermined voltage for the components being detected and noting the magnitude of an electrical parameter of said diode, then subjecting said sample to means adapted to convert at least part of said material to be detected to polar components, subjecting the resulting changed sample to a second means adapted to reduce the concentration of said interfering compound to said standard value in case an additional quantity of said interfering polar component was produced in said conversion step, then exposing said diode to the restandardized mixture and measuring the change in value of said electrical parameter.

18. A method in accordance with claim 17 in which said interfering component is water vapor and said means to establish a standardized value thereof comprises humidity stabilizers.

19. In a gas detector, a housing, a balanced electrical circuit, means in said circuit to indicate imbalance, a number of semiconductor diode sensing elements of substantially similar characteristics in said circuit, said sensing semiconductor diodes being arranged in two groups disposed in mutually opposing relationship with respect to their electrical effect on said balanced electrical circuit, each of said groups having substantially equal voltages applied to them when the circuit is at balance, a first of said groups containing a small number of sensing semiconductor diodes, while the other of said groups contains a substantially larger number of semiconductor diodes each of which operates at a substantially lower voltage than the diodes of said first group.

20. A device in accordance with claim 19 in which said groups of diodes are disposed in opposite electric biasing relationship to each other.

21. In a method of detecting a component in an ambient containing an interfering component in which a sample of said ambient is passed into contact with at least three substantially similar semiconductor sensing elements in an electrical measuring circuit, wherein said components affect said sensing elements to substantially different degrees at different applied voltages, steps compensating for effects of said interfering component comprising arranging said sensing elements into two groups in said electrical circuit in opposing effects of each other on the net electrical quantity measured, one of said groups containing at least one of said sensing elements and the other group containing at least one more sensing element than said first group, subjecting both groups of sensing elements to said ambient and observing the electrical quantity being measured while each sensing element of said first group has applied to it a voltage most favorable for detection of said compound being detected and each element of said second group has a voltage applied to it most favorable for detecting said interfering component.

22. A method in accordance with claim 21 in which said component being detected is a polar fluorine-containing organic compound.

23. A method in accordance with claim 22 in which said interfering component is water vapor.

24. A method of discriminating between at least two substances in an ambient which affect an electrical characteristic of a rectifying diode formed of two dissimilar materials one of which is a semiconductor, comprising contacting such a diode with said ambient while said diode is in an electrical circuit and is biased at a predetermined voltage and observing change in said characteristic, then changing the biasing voltage on said diode and observing the difference in change in said electrical characteristic while said ambient is in contact with said diode at said changed voltage.

25. In a gas detector, a housing, an electrically conducting base in said housing, a layer of semiconductor material on a surface of said base, a slot in said conducting base through said layer of semiconductor material dividing said semiconductor material into two portions which are not in direct contact with one another, two metal balls spaced from one another and each in contact with different portions of said semiconductor material, means in said housing that extend from said slot to an end wall of said housing to divide said housing into two compartments that are gas tight from one another and hollow metal tubes that extend to said balls from outside said housing to maintain said balls in contact with said semiconductor, whereby gas passed into said chambers is directed around said balls to the points of contact between said balls and said semiconductor material.

26. The method of detecting a first polar component in an ambient containing a plurality of polar components comprising the steps of exposing part of the boundary of a rectifying diode formed of two dissimilar materials at least one of which is a semiconductor to said ambient while said diode is in an electrical circuit, measuring a change in an electrical characteristic of said diode at two different predetermined voltages applied thereto while said boundary is exposed to said ambient, then exposing part of the boundary of said rectifying diode to said ambient free from polar components and determining said electrical characteristic of said diode at said two different predetermined voltages, noting the voltage dependence of said electrical characteristic from said changes therein at said different voltages, and determining the content of said first polar component in said ambient by comparing said determined voltage dependence with standardized voltage dependence data on single polar components.

27. A method in accordance with claim 26 in which said particular polar component is a fluorine containing organic compound.

References Cited in the file of this patent

UNITED STATES PATENTS

| | | |
|---|---|---|
| 1,792,781 | Thilo | Feb. 17, 1931 |
| 2,711,511 | Pietenpol | June 21, 1955 |
| 2,728,881 | Jacobi | Dec. 27, 1955 |
| 2,734,154 | Pankove | Feb. 7, 1956 |
| 2,776,920 | Dunlap | Jan. 8, 1957 |
| 2,940,041 | Jacobson | June 7, 1960 |
| 2,965,842 | Jacobson | Dec. 20, 1960 |

OTHER REFERENCES

Walker et al.: The Review of Scientific Instruments, vol. 28, No. 10, pages 789–792.

Berk: Physical Methods in Chemical Analysis, vol. 2, Academic Press Incorporated, New York, 1951; pages 387–437 relied on.